United States Patent Office 2,716,099
Patented Aug. 23, 1955

2,716,099

EPOXY RESINS FROM ALKYL PHENOL NOVOLAC RESINS

Theodore F. Bradley, Orinda, and Herbert A. Newey, Lafayette, Calif., assignors to Shell Development Company, Emeryville, Calif., a corporation of Delaware No Drawing. Application January 19, 1952, Serial No. 267,306

9 Claims. (Cl. 260—59)

This invention relates to a new resin having valuable properties and to a method for its production. More particularly, the invention pertains to a modified alkylated phenol novolac resin which contains a plurality of epoxy groups.

Epoxy-containing resins have been prepared heretofore by condensing epichlorhydrin with a phenol such as 2,2-bis(4-hydroxyphenyl)-propane or phloroglucinol in an alkaline medium. Such resins can be cured because they contain epoxy groups which undergo reaction upon addition to the resins of amines or polycarboxylic acid anhydrides. However, these epoxy-containing resins require use of expensive solvents in applications since they are soluble in only oxygenated solvents such as ketones, esters and ethers, or in aromatic hydrocarbons, or in highly halogenated hydrocarbons, or in mixtures thereof. Since they lack solubility in cheap paraffinic hydrocarbons available from the petroleum industry, the high cost of the special solvents needed in applications of the prior epoxy resins has prevented many commercial uses thereof.

We have now prepared resins of a new class that were discovered to be soluble in paraffin hydrocarbons. This unexpected property of solubility in cheap solvents has enabled wider uses which were precluded by the prior resins. Furthermore, our new resins can have a larger number of epoxy groups than are present in the above-noted resins. The greater functionality of our new resins is highly advantageous in curing them.

Our new epoxy resins are prepared by condensing epichlorhydrin with novolac resin of a monohydric mononuclear alkylphenol containing at least 4 carbon atoms in the alkyl group, which novolac resin contains about 3 to 12 phenolic hydroxyl groups per average molecule. The condensation is effected by mixing the novolac resin with at least about 3 mols of epichlorhydrin per phenolic hydroxyl equivalent of novolac resin and with addition of about one mole of alkali metal hydroxide per phenolic hydroxyl equivalent of novolac resin. The reaction mixture is maintained within the range of about 60° to 150° C. during the ensuing reaction. Upon completion of the reaction, the formed alkali metal salt and any unreacted hydroxide are removed from the resulting epoxy resin as are also unreacted epichlorhydrin and water, i. e., the formed epoxy resin is separated from the reaction mixture and purified.

The novolac resins employed in preparing our new epoxy resins are well known substances, many of which are available as commercial products. As is known in the art, they are produced by condensing the phenol with an aldehyde in the presence of an acid catalyst with use of a mol ratio of the phenol to aldehyde greater than about 1.1 and up to about 2.5, i. e., about 0.4 to 0.9 mol of aldehyde per mol of the phenol. For the nature and preparation of novolac resins, see the book by T. S. Carswell, Phenoplasts, 1947, page 29 et seq.

Although novolac resins from formaldehyde are generally preferred for use in the invention, novolac resins from any other aldehydes such as, for example, acetaldehyde, chloral, butyraldehyde, furfural, etc., can also be used. In order that the epoxy resin will have the solubility in parafinic hydrocarbons, it is essential that the novolac resin be derived from an alkylphenol containing at least 4, such as, for example, 4 to 18, carbon atoms in the alkyl group. Although the alkyl group can be straight-chained, it is usually preferred to have novolac resin of a phenol containing a branched-chain alkyl substituent. Among representative alkylphenols from which the novolac resin is derived for use in preparing the new epoxy resins are butylphenol, tertiary butylphenol, tertiary amylphenol, hexylphenol, 2-ethylhexylphenol, diisobutylphenol (from alkylation of phenol with diisobutylene), nonylphenol, isononylphenol (from alklation of phenol with propylene trimer), decylphenol, dodecylphenol, isododecylphenol (from alkylation of phenol with propylene tetramer or with triisobutylene), average tetradecylphenol (from alkylation of phenol with a mixture of propylene tetramer, pentamer and a little slightly higher polymer), 3-pentadecylphenol, palmitylphenol, stearylphenol, and the like. It is preferred, but not essential, that the alkyl substituent be linked to the para carbon atom of the parent phenolic nucleus. For use in preparing the epoxy resins of the invention, a novolac resin of a substance of the group consisting of p-alkylphenol, o-alkylphenol and mixtures thereof is suitable when the alkyl group contains at least 4 carbon atoms.

The novolac resin of the alkylphenol is permanently fusible and soluble because it is devoid of methylol groups when derived from formaldehyde and also devoid of corresponding substituted methylol groups when derived from other aldehydes. The novolac resin thus contains phenolic hydroxyl groups and is free of other functional groups. Although the novolac resin employed in preparing the new epoxy resin is a mixture of related compounds of different molecular weights, it contains at least about three phenolic hydroxyl groups in the average molecule thereof in order that the epoxy resin will have the desired solubility in paraffinic hydrocarbons. Novolac resins containing about 4 to 6 phenolic hydroxyl groups in the average molecule are preferred . As is known, the number of phenolic hydroxyl groups in the average molecule of the novolac resin is controlled by choice of the mol ratio of the phenol to aldehyde utilized in preparing the resin.

In order that the new epoxy resin will be a fusible product which is soluble in organic solvents including cheap paraffin hydrocarbons and not a material which is insoluble in such solvents, the epoxy resin is prepared with use of a considerable excess of epichlorhydrin over that which will combine in the stoichiometric quantity of one molecule of epichlorhydrin per phenolic hydroxyl group contained in the novolac resin. Use of the excess epichlorhydrin suppresses the tendency of the forming epoxy resin to undergo reactions which result in cross-linking so as to give undesired insoluble products. By use of at least about 3 mols of epichlorhydrin per phenolic hydroxyl equivalent of the novolac resin, the resulting epoxy resin possesses the property of solubility which gives it the great utility. By the phenolic hydroxyl equivalent of the novolac resin reference is made to the weight of novolac resin equivalent to one phenolic hydroxyl group. Thus the phenolic hydroxyl equivalent of a novolac resin from para-tertiary butylphenol and formaldehyde is considered to be 164 grams, pounds or other weight units. Usually the epoxy resin is manufactured with use of about 5 mols of epichlorhydrin per phenolic hydroxyl equivalent of the novolac resin. While as low as about 3 mols are satisfactory, it is preferred to employ epichlorhydrin in the range of about 4 to 6 mols. Larger quantities can be used, if desired, such as up to 12 mols or higher, but they give no particular advantage and are not generally used because the bulk of the excess epichlorhydrin must be recovered as a matter of economy.

The epoxy resin is formed by adding the novolac resin to the epichlorhydrin, and then adding an alkali metal hydroxide to the mixture so as to effect the desired condensation reactions. About one mol of alkali metal hydroxide such as sodium or potassium hydroxide is used with one phenolic hydroxyl equivalent of the novolac resin. The amount of alkali metal hydroxide need not be exactly one mol per equivalent of novolac resin although in general it is preferred that any variation be toward an excess such as use of 1.02, 1.05, or 1.1 mols of hydroxide per equivalent of novolac resin. It is preferred to add the alkali metal hydroxide continuously or intermittently during the course of the reaction. The addition of solid alkali metal hydroxide in the form of pellets or flakes is convenient. The rate of addition is desirably effected gradually so as to avoid the reaction mixture from becoming strongly basic or acidic. During the reaction, the reaction mixture is heated or cooled so that the temperature is maintained within the range of about 60° to 150° C. Heat is helpful in getting the reaction under way, but since the reaction is quite exothermic, cooling is generally required after initiation. It is convenient to effect the reaction in a vessel equipped with heating means and a reflux condenser. After the reaction is under way, the reaction mixture boils with heat removal and temperature control being effected by the refluxing epichlorhydrin and formed water. The reaction is preferably effected at a temperature of about 75° to 110° C., and is usually conducted at about 95° to 100° C.

Although water is one of the products of the condensation reactions, it is useful to add a small quantity to the initial mixture of reactants. For this purpose, water in amount of about 0.1 to 2% by weight of the sum of the weights of the epichlorhydrin and the novolac resin is suitable.

Upon completion of the condensation reactions of the epichlorhydrin with the novolac resin and the alkali metal hydroxide, the formed epoxy resin is separated from the reaction mixture. The separation involves removal from the epoxy resin of the unreacted excess epichlorhydrin, formed water, alkali metal chloride and any excess alkali metal hydroxide. It is convenient to first distill epichlorhydrin and water from the mixture. The residue is then dissolved in a solvent for the epoxy resin, but a non-solvent for the alkali metal chloride such as a liquid distillable hydrocarbon, for example, benzene, toluene, xylene, hexane, heptane, octane or petroleum naphtha, the solvent being used in amount of about one-half to twice the weight of epoxy resin. This causes the alkali metal chloride to precipitate from the solution. The salt is filtered or centrifuged from the mixture. The filtrate may next be washed with water to insure removal of inorganic and any other water-soluble impurities although this operation is not essential. The solvent is removed from the filtrate by distillation, preferably under subatmospheric pressure such as down to a pressure of 1 to 10 mm. Hg.

The obtained epoxy resins vary from very viscous liquids to solids at normal temperature (20° C.). Even the normally solid resins are fusible. The resins have a very complicated chemical structure. Analysis indicates that the majority such as about 60 to 90 or more per cent of the hydrogen atoms of the phenolic hydroxyl groups of the original novolac resin are replaced by glycidyl radicals. The epoxy resins also contain an appreciable proportion of alcoholic hydroxyl groups which are largely present in 2,3-dihydroxypropyl radicals that have replaced hydrogen atoms of phenolic hydroxyl groups of the original novolac resin. A small proportion of chlorine is contained in the resin, some of which is present in 3-chloro-2-hydroxypropyl groups and some in more complicated groups which are 3-chloro-2-(3-chloro-2-hydroxypropyloxy)propyl and 3-chloro-2-(2,3-epoxypropyloxy)propyl radicals linked to the phenolic ether oxygen atoms in the epoxy resin. The product may contain an insignificant amount of phenolic hydroxyl group, i. e., at most, less than about 0.3 per average molecule.

Preparation of some typical epoxy resins of the invention are illustrated in the following examples wherein the parts are by weight.

*Example 1*

A novolac resin which was a condensate of para tertiary butylphenol and formaldehyde known as Super Beckacite 3011 (Reichold Chemicals, Inc.) was used to prepare the epoxy resin. The novolac resin in amount of 328 parts (about 2 equivalents) was dissolved in 920 parts (about 10 mols) of epichlorhydrin, and 5 parts of water were added. Small pellets of sodium hydroxide in amount of 82 parts were divided into six portions of approximately equal size. The first portion was added to the solution with efficient stirring and the mixture was heated rapidly to about 80° C. Heating was then discontinued and the heat of reaction carried the temperature up to about 100° C. At ten minute intervals, the remaining portions of sodium hydroxide were added while keeping the temperature at about 95° to 100° C. After addition of all the sodium hydroxide, the mixture was stirred and refluxed for one hour. The epichlorhydrin and water were then distilled off at atmospheric pressure to a kettle temperature of about 130° C. While still warm, about 450 parts of benzene were added to the mixture and the precipitated sodium chloride was removed by filtration. The benzene was distilled off under vacuum up to a temperature of about 140° C. under a pressure of about 4 mm. Hg, leaving 398 parts of resin which was a brittle solid lighter in color than the starting novolac. Analysis of the product gave the following results:

| | |
|---|---|
| Durrans' softening point | 112° C. |
| Molecular weight | 1110 |
| Epoxy value | 0.226 equiv./100 g. |
| Alcoholic hydroxyl value | 0.178 equiv./100 g. |
| Chlorine | 1.14% |

*Example 2*

The novolac resin was prepared from an alkylphenol containing nine carbon atoms in the alkyl group obtainable by alkylating phenol with propylene trimer. Preparation of the novolac resin was effected according to the method described in U. S. Patent 2,330,217 using 663 parts (3 mols) of nonyl phenol, 226 parts of 37% formalin (2.8 mols of formaldehyde), 4 parts of oxalic acid and 1 part of the sodium salt of dioctyl sulfosuccinate. After mixing the materials in a flask fitted with a stirrer, the mixture was slowly heated to about 95° C. and held there for two hours. The contents of the flask were then subjected to distillation wherein water was removed as distillate while the temperature was slowly brought up to about 140° C. Heating was continued at this temperature for an additional hour and a half. The resulting novolac resin was obtained in amount of 708 parts.

The epoxy resin was prepared from 468 parts (about 2 equivalents) of the novolac resin, 920 parts (about 10 mols) of epichlorhydrin, 5 parts of water and 80 parts of sodium hydroxide. As described in the preceding example, the novolac resin was dissolved in the epichlorhydrin, and the water was added. The solid sodium hydroxide was added next in six portions at ten minute intervals while keeping the temperature at about 95° to 100° C. After recovering excess epichlorhydrin, and removing the salt with the aid of benzene, 554 parts of light colored epoxy resin were obtained which analyzed as follows:

Durrans' softening point ......... 68° C.
Molecular weight ................. 1296
Epoxy value ...................... 0.166 equiv./100 g.
Alcoholic hydroxyl value ......... 0.143 equiv./100 g.
Chlorine ......................... 0.81%

*Example 3*

A predominantly para alkyl phenol containing an average of 14 carbon atoms in the alkyl group obtained by alkylating phenol with propylene polymer and having a molecular weight averaging 290 was used to prepare the novolac resin. To 290 parts (about 1 equivalent) of the $C_{14}$ alkyl phenol were added 72 parts of 37% formalin (about 0.9 mol of formaldehyde), 2 parts of oxalic acid, and 0.5 part of the sodium salt of dioctyl sulfosuccinate in a flask while stirring with heating to about 93° C. in half an hour. The mixture was held within about 3 degrees of this temperature for three hours during which there was some exothermic reaction. The contents of the flask were then subjected to distillation and water was distilled off until the kettle temperature reached about 135° C. after 1.5 hours. The temperature was then taken to 150° C. and held there for one hour.

Epoxy resin was prepared from the above-described novolac resin by mixing 200 parts (about 0.66 equivalent) of the novolac resin, 300 parts (about 3.3 mols) of epichlorhydrin, and 1.5 parts of water with stirring until homogeneous. Sodium hydroxide amounting to 26.5 parts (about 0.66 mol) was divided in six equal portions and added at fifteen minute intervals with the temperature between about 95° and 100° C. as in the previous examples. After all the sodium hydroxide was added, the mixture was stirred at 95° to 100° C. for another half hour. The epichlorhydrin was distilled off to a still temperature of 120° C. at 10 mm. Benzene was added to throw out the salt, and the benzene was removed under vacuum to 130° C. at 5 mm. Two hundred forty-five parts of epoxy resin were obtained as product which analyzed as follows:

Durrans' softening point ......... 25° C.
Molecular weight ................. 1440
Epoxy value ...................... 0.102 equiv./100 g.
Alcoholic hydroxyl value ......... 0.126 equiv./100 g.
Chlorine ......................... 0.24%

*Example 4*

The novolac resin was prepared by mixing 304 parts (about 1 mol) of 3-pentadecyl phenol,

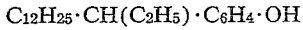

72 parts of 37% formalin (about 0.8 mol of formaldehyde), 2 parts of oxalic acid and 0.5 part of the sodium salt of dioctyl sulfosuccinate in a flask and heating to about 93° C., at which temperature the mixture was stirred for two hours. The water was then slowly distilled out while bringing the temperature up to 150° C. in the course of two hours. The mixture was held at about 150° C. for an additional hour and cooled. About 320 parts of the novolac resin were obtained.

About 102 parts (0.32 equivalents) of the novolac resin were dissolved in 304 parts (about 3.3 mols) of epichlorhydrin at 80° C. and then 1.5 parts of water were added. The mixture was cooled to about 50° C. and one-sixth of a total of about 13.1 parts of sodium hydroxide pellets was added. The temperature was then taken up to about 100° C. and the remainder of the sodium hydroxide added in five equal portions at 10 minute intervals. Upon completion of the addition of sodium hydroxide, the mixture was stirred at about 100° C. for 45 minutes. The excess epichlorhydrin was removed by distillation under vacuum to a still temperature of about 125° C. under 5 mm. pressure. Benzene was added to the residue as described in the prior examples, and the salt was filtered off. The benzene was then removed from the filtrate by vacuum distillation. The epoxy resin product in amount of 119 parts analyzed as follows:

Durrans' softening point ......... 25° C.
Molecular weight ................. 2215
Epoxy value ...................... 0.195 equiv./100 g.
Alcoholic hydroxyl value ......... 0.075 equiv./100 g.

*Example 5*

For purposes of comparison, epoxy resins were prepared from a novolac resin of phenol and from 2,2-bis(4-hydroxyphenyl)propane, herein termed bis-phenol.

In a flask, 1138 parts (12 mols) of phenol, 810 parts of 37% formalin (10 mols of formaldehyde), and 3.6 parts of $H_2SO_4$ in 50 parts of water were mixed and stirred while heating to about 75° C. whereupon the exothermic reaction increased the temperature up to 97° C. and cooling was necessary to control the reaction. The mixture was refluxed for three hours after the exothermic reaction subsided. The product was washed with hot water and some unreacted phenol removed by steam distillation. The resin was dehydrated by distillation to a final temperature of 120° C. at 5 mm. so as to obtain 1085 parts of novolac resin.

Epoxy resin was prepared from 306 parts (about 3 equivalents) of the novolac resin, 1380 parts (about 10 mols) of epichlorhydrin, and 7.5 parts of water with addition of 123 parts (about 3 mols) of sodium hydroxide being introduced in six equal portions at 10 minute intervals while keeping the temperature at about 95° to 100° C. The formed resin was recovered in usual fashion with removal of excess epichlorhydrin by distillation, precipitation of the salt with benzene, and separation of the benzene from the resin by distillation whereby 446 parts of epoxy resin were obtained having a Durrans' softening point of 27° C., a molecular weight of 530, an epoxy value of 0.537 equiv./100 g., and an alcoholic hydroxyl value of 0.09 equiv./100 g.

In like manner, epoxy resin was prepared from 228 parts of bis-phenol, 925 parts of epichlorhydrin, 4.6 parts of water and 81.5 parts of sodium hydroxide whereby the product obtained had a Durrans' softening point of 9° C., a molecular weight of 370 and an epoxy value of 0.50 equiv./100 g.

The solubility of the resins in normal heptane, toluene and petroleum naphtha was determined. The results are tabulated below wherein the symbols I means insoluble, S means soluble, and P means partially soluble.

| Epoxy Resin From— | n-Heptane | Toluene | Petroleum Naphtha |
|---|---|---|---|
| 1. Bis-phenol | I | S | I |
| 2. Phenol novolac | I | P | I |
| 3. p-tert-Butylphenol novolac | S | S | S |
| 4. $C_9$ Alkyl phenol novolac | S | S | S |

The new epoxy resins of the invention are very useful materials. They undergo cure upon addition thereto of curing agents such as mono- or poly-amines, polycarboxylic acids or acid anhydrides, and phosphoric acid or butyl dihydrogen phosphate, especially if the mixture is heated to increase the rate of cure. They are thus useful for manufacture of various articles of commerce, for application as adhesives, and for use as protective surface coatings. As noted before, their solubility in paraffins enables use in cheap solvents which is very desirable for large scale operations.

We claim as our invention:

1. A process for production of an epoxy resin which comprises condensing epichlorhydrin in basic medium with novolac resin of an aldehyde and a mononuclear monohydric alkylphenol containing at least 4 carbon atoms in the alkyl group, which novolac resin contains about 3 to 12 phenolic hydroxyl groups per average molecule, said condensation being effected by mixing the novolac resin with at least about 3 mols of epichlorhydrin per phenolic hydroxyl equivalent of the novolac resin and reacting the mixture at about 60° to 150° C. with addition of about one mol of an alkali metal hydroxide per phenolic hydroxyl equivalent of the novolac resin.

2. An epoxy resin obtained by condensing epichlorhydrin in basic medium with novolac resin of an aldehyde and a mononuclear monohydric alkylphenol containing at least 4 carbon atoms in the alkyl group, which novolac resin contains about 3 to 12 phenolic hydroxyl groups per average molecule, said condensation being effected by mixing the novolac resin with at least about 3 mols of epichlorhydrin per phenolic hydroxyl equivalent of the novolac resin and reacting the mixture at about 60° to 150° C. with addition of about one mol of an alkali metal hydroxide per phenolic hydroxyl equivalent of the novolac resin.

3. A process for production of an epoxy resin which comprises condensing epichlorhydrin in basic medium with novolac resin of formaldehyde and a mononuclear monohydric alkylphenol containing 4 to 18 carbon atoms in the alkyl group, which novolac resin contains about 4 to 6 phenolic hydroxyl groups in the average molecule, said condensation being effected by mixing the novolac resin with about 4 to 6 mols of epichlorhydrin per phenolic hydroxyl equivalent of the novolac resin and about 0.1 to 2% of water, and reacting the mixture at about 75° to 110° C. while intermittently adding a total of about one mol of solid sodium hydroxide per phenolic hydroxyl equivalent of the novolac resin.

4. A process for production of an epoxy resin which comprises condensing epichlorhydrin in basic medium with novolac resin of formaldehyde and para tertiary butylphenol, which novolac resin contains about 3 to 12 phenolic hydroxyl groups per average molecule, said condensation being effected by mixing the novolac resin with about 4 to 6 mols of epichlorhydrin per phenolic hydroxyl equivalent of the novolac resin and about 0.1 to 2% of water, and reacting the mixture at about 75° to 110° C. with addition of about one mol of sodium hydroxide.

5. An epoxy resin obtained by condensing epichlorhydrin in basic medium with novolac resin of formaldehyde and para tertiary butylphenol, which novolac resin contains about 3 to 12 phenolic hydroxyl groups per average molecule, said condensation being effected by mixing the novolac resin with about 4 to 6 mols of epichlorhydrin per phenolic hydroxyl equivalent of the novolac resin and about 0.1 to 2% of water, and reacting the mixture at about 75° to 110° C. with addition of about one mol of sodium hydroxide.

6. A process for production of an epoxy resin which comprises condensing epichlorhydrin in basic medium with novolac resin of formaldehyde and an alkylphenol containing 9 carbon atoms in the alkyl group, which novolac resin contains about 3 to 12 phenolic hydroxyl groups per average molecule, said condensation being effected by mixing the novolac resin with about 4 to 6 mols of epichlorhydrin per phenolic hydroxyl equivalent of the novolac resin and about 0.1 to 2% of water, and reacting the mixture at about 75° to 110° C. with addition of about one mole of sodium hydroxide.

7. An epoxy resin obtained by condensing epichlorhydrin in basic medium with novolac resin of formaldehyde and an alkylphenol containing 9 carbon atoms in the alkyl group, which novolac resin contains about 3 to 12 phenolic hydroxyl groups per average molecule, said condensation being effected by mixing the novolac resin with about 4 to 6 mols of epichlorhydrin per phenolic hydroxyl equivalent of the novolac resin and about 0.1 to 2% of water, and reacting the mixture at about 75° to 110° C. with addition of about one mol of sodium hydroxide.

8. A process for production of an epoxy resin which comprises condensing epichlorhydrin in basic medium with novolac resin of formaldehyde and 3-pentadecyl phenol, which novolac resin contains about 3 to 12 phenolic hydroxyl groups per average molecule, said condensation being effected by mixing the novolac resin with about 4 to 6 mols of epichlorhydrin per phenolic hydroxyl equivalent of the novolac resin and about 0.1 to 2% of water, and reacting the mixture at about 75° to 110° C. with addition of about one mol of sodium hydroxide.

9. An epoxy resin obtained by condensing epichlorhydrin in basic medium with novolac resin of formaldehyde and 3-pentadecyl phenol, which novolac resin contains about 3 to 12 phenolic hydroxyl groups per average molecule, said condensation being effected by mixing the novolac resin with about 4 to 6 mols of epichlorhydrin per phenolic hydroxyl equivalent of the novolac resin and about 0.1 to 2% of water, and reacting the mixture at about 75° to 110° C. with addition of about one mol of sodium hydroxide.

References Cited in the file of this patent

UNITED STATES PATENTS

| | | |
|---|---|---|
| 2,076,624 | De Groote | Apr. 13, 1947 |
| 2,454,541 | Bock | Nov. 23, 1948 |
| 2,454,542 | Bock | Nov. 23, 1948 |
| 2,499,365 | De Groote | Mar. 7, 1950 |
| 2,658,885 | D'Alelio | Nov. 10, 1953 |

FOREIGN PATENTS

| | | |
|---|---|---|
| 630,663 | Great Britain | Oct. 18, 1949 |
| 503,546 | Belgium | June 15, 1951 |
| 503,550 | Belgium | June 15, 1951 |